US008845001B2

(12) United States Patent
Kotama et al.

(10) Patent No.: US 8,845,001 B2
(45) Date of Patent: Sep. 30, 2014

(54) DEVICE FOR DETECTING OPENING/CLOSING OF CHARGER LID

(75) Inventors: Takeshi Kotama, Kariya (JP); Shinsuke Nakashima, Kariya (JP); Reiji Mikami, Kariya (JP); Yasuhiko Yamamoto, Kariya (JP); Masahiro Kato, Aichi (JP); Takashi Yamagami, Nagoya (JP)

(73) Assignees: Toyota Shatai Kabushiki Kaisha, Aichi-ken (JP); Kabushiki Kaisha Tokai Riki Denki Seisakusho, Aichi (JP)

( * ) Notice: Subject to any disclaimer, the term of this patent is extended or adjusted under 35 U.S.C. 154(b) by 0 days.

(21) Appl. No.: 13/818,070

(22) PCT Filed: Oct. 12, 2010

(86) PCT No.: PCT/JP2010/067881
§ 371 (c)(1),
(2), (4) Date: Aug. 26, 2013

(87) PCT Pub. No.: WO2012/049733
PCT Pub. Date: Apr. 19, 2012

(65) Prior Publication Data
US 2013/0326955 A1 Dec. 12, 2013

(51) Int. Cl.
*B62D 25/00* (2006.01)
(52) U.S. Cl.
USPC ........................................ 296/97.22
(58) Field of Classification Search
USPC .................... 296/97.22; 200/526; 362/276 X
See application file for complete search history.

(56) References Cited

U.S. PATENT DOCUMENTS

| 4,225,764 | A | * | 9/1980 | Buttner .......................... 200/518 |
| 4,811,984 | A | * | 3/1989 | Hempel ..................... 296/97.22 |
| 4,954,932 | A | * | 9/1990 | Isenga ............................ 362/477 |
| 4,971,382 | A | | 11/1990 | Ohno |
| 5,757,595 | A | | 5/1998 | Ozawa et al. |
| 6,113,160 | A | * | 9/2000 | Johansson et al. ............. 292/169 |
| 6,793,266 | B2 | * | 9/2004 | Park ............................ 296/97.22 |

(Continued)

FOREIGN PATENT DOCUMENTS

| JP | 63-192624 A | 8/1988 |
| JP | 5-213122 A | 8/1993 |

(Continued)

OTHER PUBLICATIONS

English translation of the International Preliminary Report on Patentability for International Application No. PCT/JP2010/067881, filed Oct. 12, 2010.

*Primary Examiner* — Jerry Redman
(74) *Attorney, Agent, or Firm* — Kilpatrick Townsend & Stockton LLP (57) ABSTRACT

A push lifter is provided with a push-push mechanism. When a charger lid is positioned in a closed position to close a battery charging opening, the push-push mechanism holds a push rod in a standby state. When the charger lid, which is positioned in the closed position, is pressed so that the standby state of the push rod is cancelled, the push-push mechanism pushes the push rod with the urging force of a coil spring so that the charger lid opens. An illumination lamp turns off when a switch portion turns off due to the standby state of the push rod, and the lamp turns on when the switch portion turns on due to the standby state of the push rod being cancelled.

7 Claims, 6 Drawing Sheets

(56) References Cited

U.S. PATENT DOCUMENTS

| | | | |
|---|---|---|---|
| 6,834,688 B2 * | 12/2004 | Ono et al. | 141/94 |
| 7,036,948 B1 * | 5/2006 | Wyatt | 362/95 |
| 8,292,113 B2 * | 10/2012 | Nakaya | 220/315 |
| 8,353,553 B2 * | 1/2013 | Beck | 296/97.22 |
| 8,585,119 B2 * | 11/2013 | Beck | 296/97.22 |
| 8,627,860 B2 * | 1/2014 | Ferguson et al. | 141/98 |
| 8,684,443 B2 * | 4/2014 | Hara | 296/97.22 |
| 8,720,968 B2 * | 5/2014 | Zalan et al. | 296/97.22 |
| 2009/0039991 A1 | 2/2009 | Atkins et al. | |
| 2009/0139991 A1 * | 6/2009 | Nakaya | 220/315 |
| 2009/0307869 A1 * | 12/2009 | Salice | 16/85 |
| 2009/0309386 A1 * | 12/2009 | Yamamoto | 296/97.22 |
| 2010/0045450 A1 | 2/2010 | Suzuki et al. | |
| 2013/0095678 A1 * | 4/2013 | Hara | 439/136 |

FOREIGN PATENT DOCUMENTS

| | | |
|---|---|---|
| JP | 07-087607 A | 3/1995 |
| JP | 2506142 Y2 | 8/1996 |
| JP | 2564902 B2 | 12/1996 |
| JP | 9-285022 A | 10/1997 |
| JP | 2001-195944 | 7/2001 |
| JP | 2007-290573 A | 11/2007 |
| WO | WO2007/122835 A1 | 11/2007 |
| WO | WO2008/143155 A1 | 11/2008 |

* cited by examiner

DEVICE FOR DETECTING OPENING/CLOSING OF CHARGER LID

FIELD OF THE INVENTION

The present invention relates to a device for detecting opening/closing of a charger lid provided in a vehicle body.

BACKGROUND OF THE INVENTION

Recently, electric vehicles, hybrid vehicles, fuel cell vehicles and the like have attracted attention as environmentally-friendly vehicles. Each of these vehicles is provided with an electric motor generating a traveling drive force and an electrical storage device. The electrical storage device is provided with a secondary battery for storing electric power to be supplied to the electric motor. The electrical storage device for a vehicle is expected to store electricity from an external power supply while the vehicle is not used or at night, for example. Thus, a battery charging opening is provided on an outer face of the vehicle body. When charging is not performed, the battery charging opening is covered by a charger lid. When charging is to be performed, the charger lid is opened, and a charging cable connected to the external power supply is connected to a charging socket provided in the battery charging opening.

Battery charging openings with a charger lid have been known through Patent Document 1 and Patent Document 2. Each of the devices disclosed in Patent Document 1 and Patent Document 2 is provided with a charger lid opening/closing the battery charging opening and an opening/closing switch for detecting opening/closing of a charger lid. In the device disclosed in Patent Document 1, an electronic controller executes control during charging on the basis of on/off of the opening/closing switch. However, although Patent Document 1 discloses the opening/closing switch provided in an electric circuit, it does not specifically disclose how the opening/closing switch is arranged with respect to the charger lid. Moreover, Patent Document 1 does not disclose a configuration for holding the charger lid at a closed position where the battery charging opening is closed.

In the device disclosed in Patent Document 2, if the charger lid is closed, the opening/closing switch is pressed by a lock bolt provided on a back surface of a charger lid. As a result, the opening/closing switch is switched, and a motor feed circuit and the battery are connected. If the charger lid is opened, and pressing by the lock bolt is cancelled, the opening/closing switch is switched, so that the battery is connected to a display provided on an instrument panel of the vehicle. Moreover, in the device disclosed in Patent Document 2, a lock mechanism for locking the charger lid at a closed position is provided. According to this lock mechanism, by operating a pulling tool provided in the vicinity of the instrument panel on the driver's seat side, locking by the lock mechanism is unlocked through a cable connected to the pulling tool. When the locking by the lock mechanism is unlocked, the charger lid is opened by a spring of the opening/closing switch. However, with the device disclosed in Patent Document 2, the lock mechanism for holding the charger lid at the closed position is necessary. Thus, the number of components and the number of assembling steps are increased, and a manufacturing cost is also increased.

In the device disclosed in Patent Document 3, a device for detecting opening/closing of a lid of a filler opening is provided in the periphery of the filler opening of the vehicle. This configuration is only a general example illustrating arrangement of the device for detecting opening/closing of the lid of the filler opening in an automobile. The device disclosed in Patent Document 3 is also provided with a lock mechanism for locking the lid at the closed position similarly to Patent Document 2. That is, by operating a lever provided on the driver's seat, the locking by the lock mechanism is unlocked through a cable connected to the lever, and the lid is opened. Thus, even if the technology disclosed in Patent Document 3 is applied to the device for detecting opening/closing of a charger lid, the same problem as that in Patent Document 2 remains.

Usually, in an automobile, a door courtesy switch is provided for detecting opening/closing of a door. This door courtesy switch can be used for detecting opening/closing of a charger lid. The door courtesy switch is provided with an actuator operated with opening/closing of the door and a return spring for a returning operation of the actuator. If the door courtesy switch is applied to a device for detecting opening/closing of a charger lid, the charger lid is pressed onto the actuator by an action of the return spring, and the charger lid cannot be held at the closed position.

PRIOR ART DOCUMENT

Patent Documents

Patent Document 1: Japanese Laid-Open Patent Publication No. 9-285022

Patent Document 2: Japanese Laid-Open Patent Publication No. 5-213122

Patent Document 3: Japanese Laid-Open Patent Publication No. 63-192624

SUMMARY OF THE INVENTION

An objective of the present invention is to provide a device for detecting opening/closing of a charger lid that reduces the number of components and the number of assembling steps and reduces manufacturing costs.

To achieve the foregoing objective and in accordance with a first aspect of the present invention, a device for detecting opening/closing of a charger lid provided in the vicinity of a battery charging opening of a vehicle body is provided. The device includes a first urging means for urging the charger lid in a closing direction, a push rod provided in the battery charging opening and capable of pushing up the charger lid, an illumination means provided in the battery charging opening and capable of illuminating an inside of the battery charging opening, a switch means for turning on/off the illumination means, a second urging means for urging the charger lid in an opening direction, and a push-push mechanism. When the charger lid is located at a closed position for closing the battery charging opening, the push-push mechanism holds the push rod in a standby state. When the charger lid located at the closed position is pressed and the standby state of the push rod is cancelled, the push-push mechanism opens the charger lid by pushing up the push rod by an urging force of the second urging means. When the switch means is turned off by the push rod in the standby state, the illumination means is turned off. When the switch means is turned on by the push rod no longer in the standby state, the illumination means is turned on.

According to this configuration, the lock mechanism is not necessary, the charger lid can be held at a closed position, and the illumination means for illuminating the battery charging opening can be turned on/off in accordance with opening/ closing of a charger lid. Thus, the number of components and the number of assembling steps and the manufacturing costs are reduced.

In the above described device for detecting opening/closing of a charger lid, a display means for displaying charging-related information is preferably provided at the battery charging opening.

According to this configuration, unlike a configuration in which the display means for displaying charging-related information on an instrument panel in front of a driver's seat of a vehicle is provided, an operator can check the charging-related information during charging at the battery charging opening. Thus, the operator does not have to move to the display means provided on the instrument panel in front of the driver's seat in order to check the charging-related information. Moreover, since the display means is far from the battery charging opening, relevance between a charging operation at the battery charging opening and the display of the charging-related information is low, making it difficult for the operator to understand. In that sense, according to the present invention, since the display means is provided at the battery charging opening, relevance between the charging operation at the battery charging opening and the display of the charging-related information becomes high, making it easier for the operator to understand.

In the above described device for detecting opening/closing of a charger lid, it is preferable that the charging-related information be a charging state of an onboard secondary battery, the display means be a charging indicator indicating the charging state, the switch means and the charging indicator be integrated by a common insulator, and the insulator include a connection terminal to be connected to a circuit of each of the switch means and the charging indicator.

According to this configuration, since the switch means and the charging indicator are integrated by the common insulator, the switch means and the charging indicator can be attached to the battery charging opening by using the common insulator. Moreover, wire connection between the switch means and the charging indicator can be made easily by using the connection terminal.

If the switch means and the charging indicator are provided separately, operation for attaching them to the battery charging opening must be performed separately.

Moreover, wire connection between an external circuit and the switch means as well as the charging indicator needs to be made separately, which requires labor.

The above described device for detecting opening/closing of a charger lid preferably further includes an electronic control unit, which is connected to the switch means and is activated when the switch means is turned on. The electronic control unit preferably displays obtained charging-related information on the display means.

According to this configuration, if the switch means is turned on, the electronic controller is activated, and charging-related information relating to an onboard secondary battery is obtained. Then, the electronic controller can display the obtained charging-related information on the display means.

The above described device for detecting opening/closing of a charger lid preferably further includes an electronic control unit, which is connected to the switch means and is activated when the switch means is turned on. It is preferable that the electronic control unit turn on the illumination means when the switch means is turned on, and the electronic control unit turn off the illumination means when the switch means is turned off.

According to this configuration, the electronic controller can turn on the illumination means if the switch means is turned on, and turn off the illumination means if the switch means is turned off.

In the above described device for detecting opening/closing of a charger lid, it is preferable that the charging-related information be a battery remaining level of an onboard secondary battery, the display means be a battery remaining level display means indicating the battery remaining level, the switch means and the battery remaining level display means be integrated by a common insulator, and the insulator include a connection terminal to be connected to a circuit of each of the switch means and the battery remaining level display means.

According to this configuration, since the switch means and the display means are integrated by the common insulator, the switch means and the display means can be attached to the battery charging opening by using the common insulator. Moreover, the wire connections between the switch means and the battery remaining level display means as well as the circuit provided in the vehicle can be made easily through the connection terminals.

The above described device for detecting opening/closing of a charger lid preferably further include an electronic control unit, which is connected to the switch means and is activated when the switch means is turned on. It is preferable that the electronic control unit monitor a battery remaining level state of the onboard secondary battery and displays the battery remaining level state on the battery remaining level display means.

According to this configuration, if the switch means is turned on, the electronic controller is activated and monitors the battery remaining level of the onboard secondary battery and also displays the battery remaining level in accordance with the battery remaining level.

DETAILED DESCRIPTION OF THE PREFERRED EMBODIMENTS

A device for detecting opening/closing of a charger lid according to one embodiment of the present invention will be described below by referring to FIGS. 1 to 7.

Figure 1:
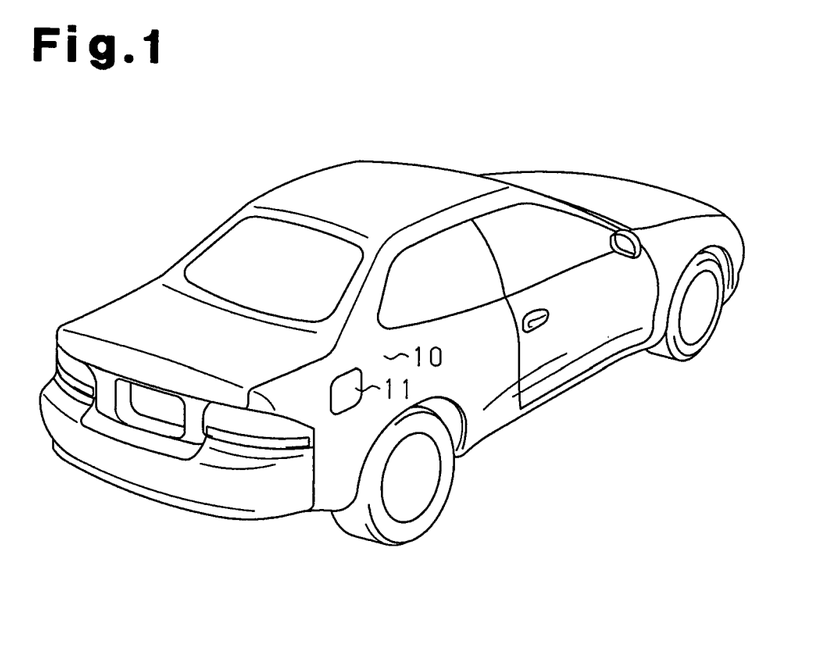
FIG. 1 is a perspective view of a vehicle such as an electric vehicle.
Figure 2:
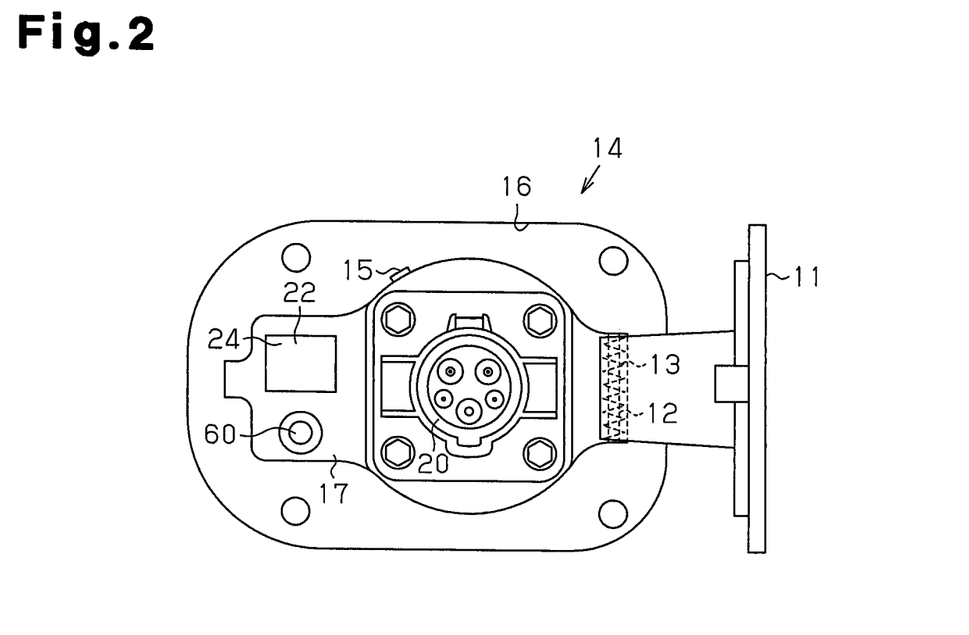
FIG. 2 is a front view of a battery charging opening in which a charging lid is opened.

As illustrated in FIGS. 1 and 2, a battery charging opening 14 is provided in the vicinity of a rear wheel of a vehicle body 10 of an electric vehicle. A charger lid 11 for opening/closing the battery charging opening 14 is provided on the vehicle body 10. The battery charging opening 14 is provided with a recess 16 on an outer surface of the vehicle body 10. The charger lid 11 is supported to be opened/closed through a hinge portion 12 with respect to a panel (not shown) of the vehicle body 10. A torsion coil spring 13 as a first urging means is provided on the hinge portion 12. By means of the torsion coil spring 13, the charger lid 11 is urged in a direction to close the battery charging opening 14. Moreover, the charger lid 11 is arranged on the same plane as the outer surface of the vehicle body 10 at the closed position for closing the battery charging opening 14.

Figure 3:
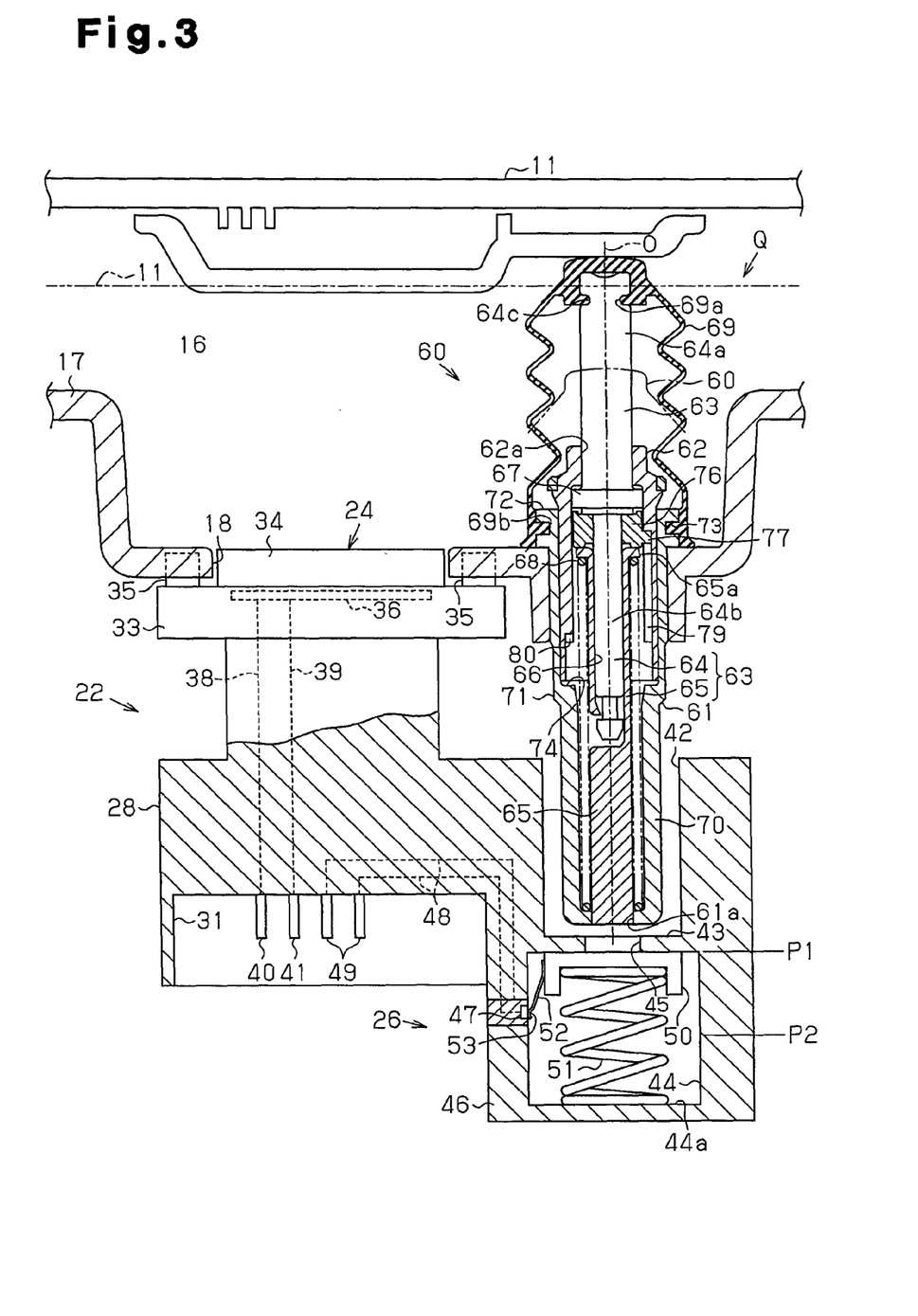
FIG. 3 is a cross-sectional view of the battery charging opening.

A battery charging connector 20 is attached to a bottom wall 17 of the recess 16. An illumination lamp 15 as an illumination means is provided on the bottom wall 17. The illumination lamp 15 is composed of an LED, but that is not limiting. Moreover, on the bottom wall 17, a display device 22 is attached adjacent to the battery charging connector 20. As illustrated in FIG. 3, in the display device 22, a display portion 24 and a switch portion 26 as a switch means are integrated by an insulator 28 made of an insulating plastic.

The insulator 28 has a block-shaped base 30. The base 30 has an extended portion 32 extending toward the bottom wall 17. The display portion 24 is provided on the extended portion 32 of the base 30. A flange 33 is provided at a distal end of the extended portion 32. The flange 33 is tightened by a tightening member 35 such as a bolt to the back surface of the bottom wall 17. As a result, the display device 22 is fixed to the back surface of the bottom wall 17. The display device 22 corresponds to the display means.

Figure 7A:
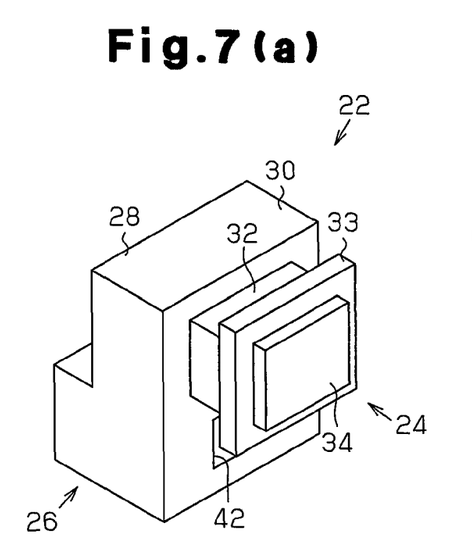
FIG. 7(a) is a perspective view of a charging indicator and a courtesy assembly.
Figure 7B:
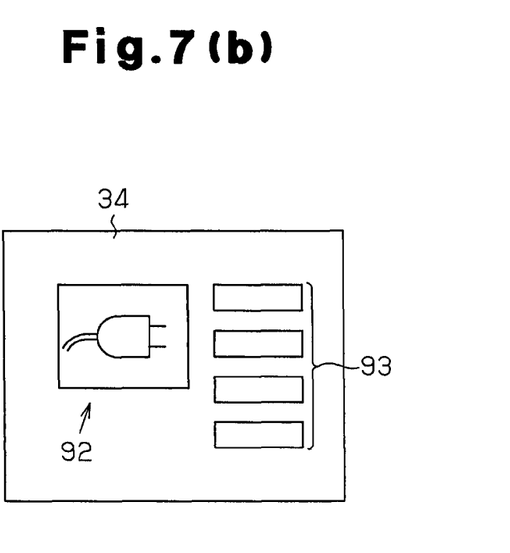
FIG. 7(b) is a front view of a display portion.

As illustrated in FIGS. 3 and 7(b), the display portion 24 is provided with a display panel 34 provided on an end face of the extended portion 32 and a circuit board 36 provided in the extended portion 32. The display panel 34 is fitted in a through hole 18 provided in the bottom wall 17 with the display surface facing the recess 16.

A signal line 38 arranged on the extended portion 32 and the base 30 and a power line 39 are electrically connected to the circuit board 36. FIG. 3 illustrates only a part of the signal line 38 and the power line 39 for purposes of illustration. A connection port 31 is provided on a surface on the side (base end surface) opposite to the extended portion 32 in the base 30. The signal line 38 and the power line 39 are electrically connected to male terminals 40 and 41 as connection terminals protruded from a bottom surface of the connection port 31. The connection terminals may be female terminals. The switch portion 26 is provided on the side of the base 30.

A cylindrical insertion port 42 with a bottom is provided in the switch portion 26. The insertion port 42 is opened to face the bottom wall 17. An accommodation chamber 44 is formed in the base 30 such that a bottom wall 43 is located between itself and the insertion port 42. A through hole 45 communicating with the accommodation chamber 44 is provided in the bottom wall 43.

A pair of fixed electrodes 47 is provided on a side wall 46 of the accommodation chamber 44. The pair of fixed electrodes 47 is aligned in a direction perpendicular to the sheet of the drawing of FIG. 3. A signal line 48 in the base 30 is electrically connected to the fixed electrodes 47. The signal line 48 is electrically connected to a male terminal 49 as the connection terminal protruded from the bottom surface of the connection port 31. The connection terminal may be a female terminal.

A movable member 50 made of an insulating material is accommodated in the accommodation chamber 44. The movable member 50 is guided movably in a vertical direction by a guide groove (not shown). That is, the movable member 50 is guided to get close to and to separate from the bottom wall 43 by the guide groove. A return spring 51 made of a coil spring is arranged between the movable member 50 and a bottom surface 44a of the accommodation chamber 44. The movable member 50 is urged by the return spring 51 all the time toward the bottom wall 43. The movable member 50 is supported movably between a position P1 (see FIG. 3) in contact with the back surface of the bottom wall 43 and a position P2 (see FIG. 5(a)) spaced the farthest away from the back surface of the bottom wall 43 by a urging force of the return spring 51.

A movable electrode 52 having a pair of contact portions 53 is fixed on a side face of the movable member 50. Each movable electrode 52 can be brought into contact with each of the pair of fixed electrodes 47. FIG. 3 illustrates only one of the contact portions 53.

The switch portion 26 is composed of the fixed electrode 47, the movable member 50, and the movable electrode 52. When the movable member 50 is located at the position P1, the pair of contact portions 53 of the movable electrode 52 is short-circuited between the pair of fixed electrodes 47. As a result, the switch portion 26 is turned on. When the movable member 50 moves to the position P2, each of the contact portions 53 of the movable electrode 52 is spaced apart from each of the fixed electrodes 47. As a result, the switch portion 26 is turned off.

As illustrated in FIGS. 2 to 4(b), a push lifter 60 is arranged at a position opposite to a free end of the charger lid 11 on the bottom wall 17 of the battery charging opening 14. The push lifter 60 is provided with a cylindrical holder 61 with a bottom. The cylindrical holder 61 extends through and is fixed to a mounting hole 19 of the bottom wall 17. The holder 61 is made of a plastic. In the holder 61, a substantially cylindrical sleeve 62 is inserted and fixed. The sleeve 62 is made of a plastic. A push rod 63 is slidably arranged in the holder 61 and the sleeve 62. The push rod 63 is made of a plastic.

The push rod 63 is composed of a rod main body 64 having a flange 67 at the center in the axial direction and a pressing bar 65. The rod main body 64 has an upper portion 64a above the flange 67. The upper portion 64a of the rod main body 64 can protrude to the outside through a hole 62a in a distal end surface of the sleeve 62. The rod main body 64 has a lower portion 64b below the flange 67. The lower portion 64b of the rod main body 64 is inserted and fixed into a fitting hole 66 at the distal end of the pressing bar 65. As a result, the rod main body 64 is arranged and connected coaxially with the pressing bar 65.

A flange 65a is formed on the upper end of the pressing bar 65. A coil spring 68 as a second urging means is arranged between the flange 65a and the bottom wall of the holder 61. By means of the coil spring 68, the push rod 63 is urged all the time in a direction to protrude the upper portion 64a. A guide hole 61a is provided in the bottom wall of the holder 61 coaxially with the through hole 45.

A cam body 76 is fitted with the lower portion 64b of the rod main body 64. The cam body 76 is provided between the flange 65a and the flange 67. The cam body 76 is rotationally supported around an axis O of the rod main body 64. Four cam portions 77 are provided at equal intervals on an outer peripheral surface of the cam body 76. Each cam portion 77 has a pair of end portions located in the circumferential direction and formed such that the width of one end portion is larger than the width of the other end portion.

The upper portion 64a of the rod main body 64 is covered by a cap-shaped cover 69. The cover 69 is made of synthetic rubber or a plastic or the like and has elasticity. The peripheral surface of the cover 69 is formed to have a bellows shape.

Ring-shaped projected rims 69a and 69b are formed on the upper inner peripheral surface and a lower inner peripheral surface of the cover 69, respectively. The projected rim 69a of the cover 69 is engaged with an engagement groove 64c provided at a distal end of the rod main body 64. The projected rim 69b of the cover 69 is engaged with a groove 73 provided in the upper outer peripheral surface of the holder 61. As described above, the cover 69 is assembled to the holder 61 and the push rod 63 to be expanded/contracted.

Figure 4A:
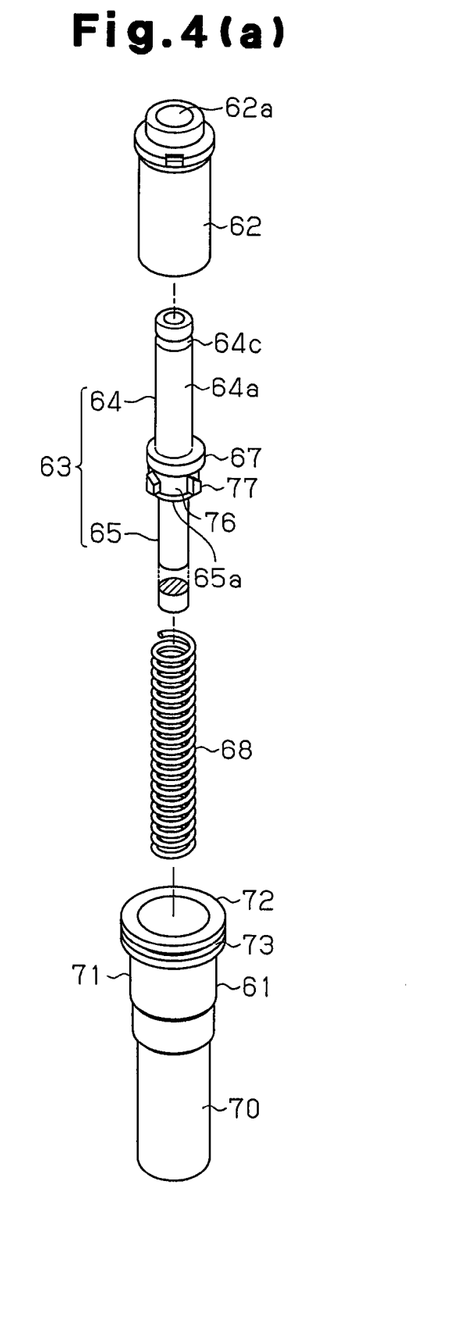
FIGS. 4(a) and 4(b) are exploded perspective views of a push lifter.
Figure 4B:
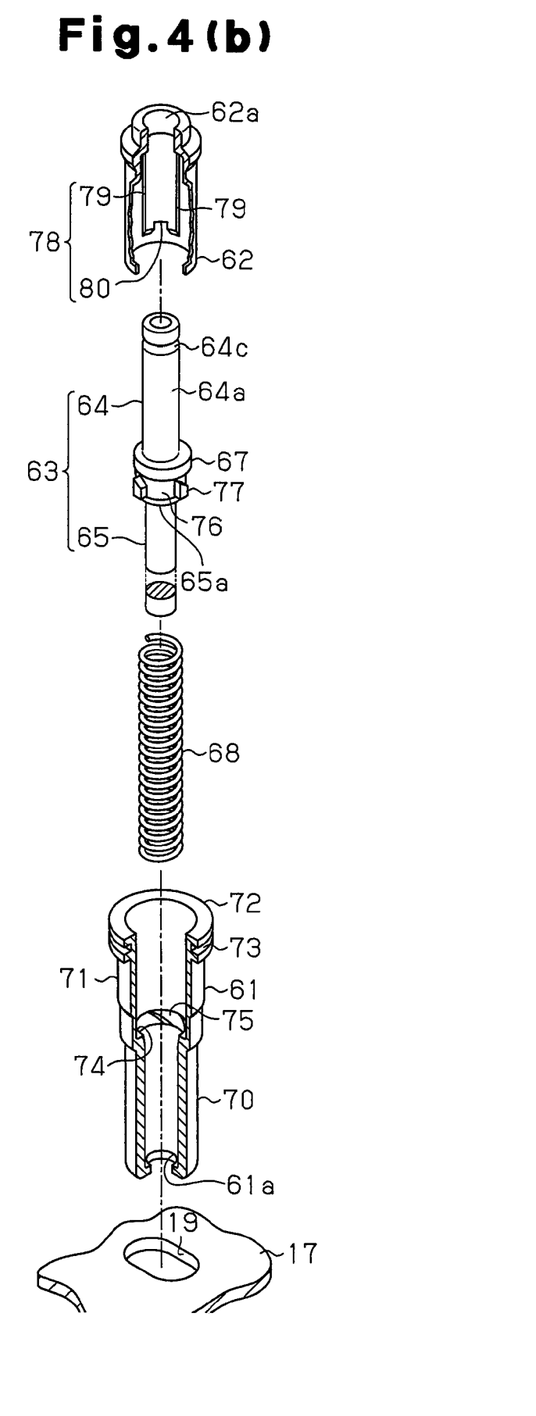

The holder 61 has a cylinder portion 70 for accommodating the coil spring 68, a large-diameter portion 71 formed on the upper part of the cylinder portion 70, and a flange portion 72 formed on the upper part of the large-diameter portion 71. A stepped portion 74 is formed on a lower inner peripheral surface of the large-diameter portion 71. An inner diameter of the holder 61 is set larger on the upper part from the stepped portion 74 than on the lower part. As illustrated in FIG. 4(b) in a simplified manner, a plurality of gradient portions 75 as guide portions is helically and continuously formed on the upper face of the stepped portion 74.

Each time the push rod 63 is pressed, each gradient portion 75 guides each cam portion 77 along the inclination of the gradient portion 75 and rotates the cam body 76 in one direction only by a predetermined angle (22.5°, for example). When the push rod 63 rises also, each gradient portion 75 hits a rib (not shown) and rotates the cam body 76 in one direction by a predetermined angle (22.5°, for example). The pressing bar 65 is inserted into the coil spring 68 and also arranged slidably in the guide hole 61a of the holder 61.

Four guide portions 78 are provided at equal intervals on an inner peripheral surface of the sleeve 62. Each guide portion 78 is formed of a long groove 79 extending in the vertical direction and a shallow groove 80 adjacent to the long groove 79 in the circumferential direction. Since the guide portions 78 are adjacent to each other, the long grooves 79 and the shallow grooves 80 are arranged alternately in the circumferential direction.

Figure 5A:
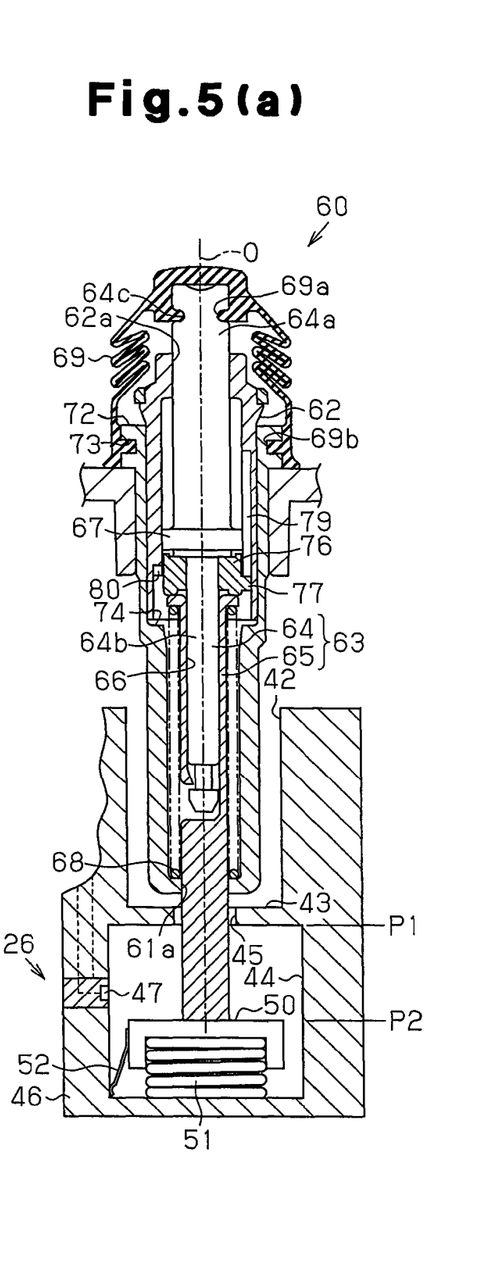
FIGS. 5(a) and 5(b) are cross-sectional views of the push lifter.
Figure 5B:
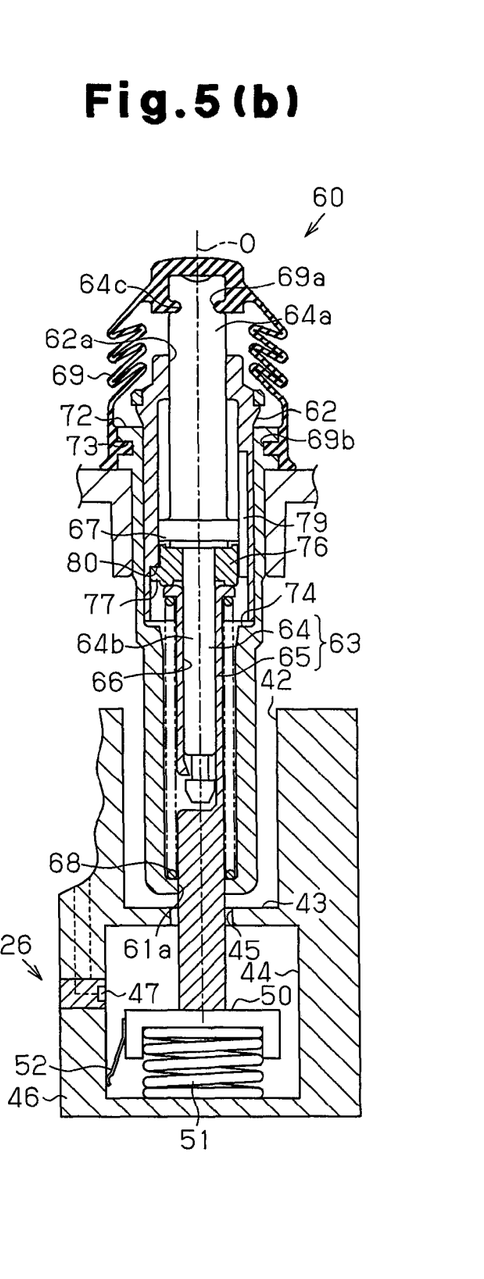

FIG. 4(b) illustrates a set of the guide portion 78 and only another long groove 79 adjacent to the set of the guide portion 78. In FIGS. 3, 5(a) and 5(b), the long groove 79 and the shallow groove 80 are illustrated to sandwich the axis O of the rod main body 64 for purposes of illustration. On a cross-section actually cut along the axis O, only one pair of the long grooves 79 or one pair of the shallow grooves 80 appear sandwiching the axis O.

The cam portion 77 of the cam body 76 is movably engaged with the long groove 79 and the shallow groove 80. An open port is provided in the lower ends of the long groove 79 and the shallow groove 80. The cam portion 77 is selectively inserted from the open ports of the long groove 79 and the shallow groove 80. The push rod 63, the cam body 76, the coil spring 68, the long groove 79, the shallow groove 80, and the gradient portion 75 constitute a push-push mechanism.

Next, the electric configuration of the device for detecting opening/closing of a charger lid will be described by referring to FIGS. 6 and 7(b).

Figure 6:
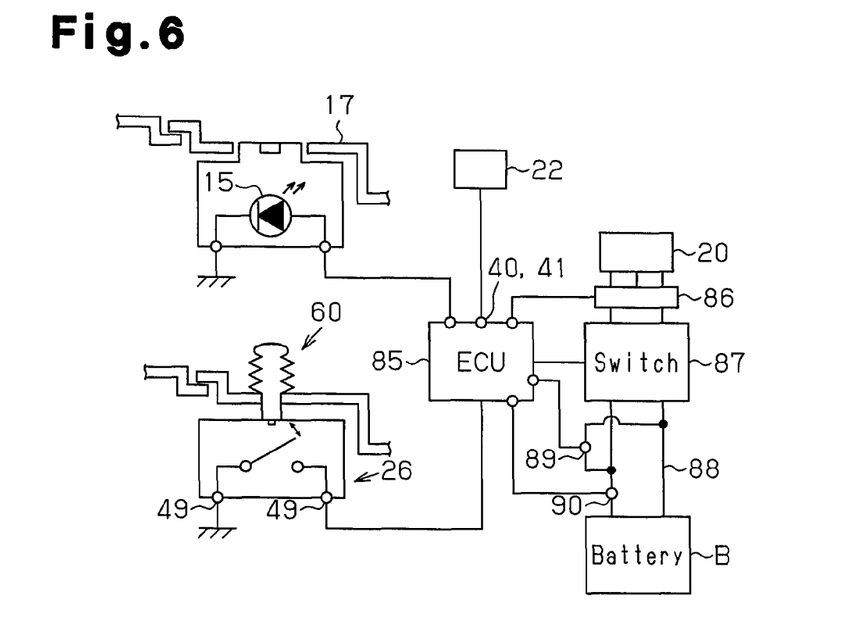
FIG. 6 is an electric circuit diagram of a device for detecting opening/closing, an ECU, and an illumination lamp.

As illustrated in FIG. 6, a battery B, which is an onboard secondary battery, is connected to the battery charging connector 20 through a battery charger 86 and a switch circuit 87. The battery B is a power supply of a driving motor for running in the electric automobile. A voltage sensor 89 and a current sensor 90 are provided in a charging circuit 88 between the switch circuit 87 and the battery B. The sensors 89 and 90 are connected to an electronic control unit (ECU) 85. The electronic control unit 85 monitors whether an AC power supply is connected to the battery charger 86 or not. The electronic control unit 85 controls on/off of the switch circuit 87 on the basis of the monitoring result.

The electronic control unit 85 monitors a charging state and the battery remaining level of the battery B on the basis of a current value and a voltage value, which are detection signals from the voltage sensor 89 and the current sensor 90. As illustrated in FIG. 7(b), a charging indicator 92 and a battery remaining level display portion 93 displaying a battery remaining level state of the battery B are provided on the display panel 34 of the display device 22. The battery remaining level display portion 93 corresponds to the battery remaining level display means. The electronic control unit 85 is connected to the display device 22 through male terminals 40 and 41 and lead wires connected to them. The electronic control unit 85 controls the charging indicator 92 and the battery remaining level display portion 93 of the display device 22 on the basis of the above-described monitor result.

As illustrated in FIG. 6, the switch portion 26 is connected to the electronic control unit 85 through the male terminal 49 and a lead wire connected to that. The electronic control unit 85 is activated when the switch portion 26 is turned on. Then, the electronic control unit 85 turns on the illumination lamp 15. When the switch portion 26 is turned off, the electronic control unit 85 turns off the illumination lamp 15. The battery remaining level and the charging state correspond to the charging-related information.

Subsequently, operation of the device for detecting opening/closing of a charger lid described above will be described below. For purposes of illustration, the explanation will be started at a state where the charger lid 11 has been already opened.

FIG. 3 illustrates a state where the push rod 63 protrudes the most toward the charger lid 11 by the urging force of the coil spring 68. As illustrated in FIG. 3, in the push-push mechanism, each cam portion 77 of the push rod 63 is locked by an upper end of the corresponding long groove 79 in the guide portion 78 of the sleeve 62. The charger lid 11 rotationally moves in an open direction only by a predetermined angle by using the hinge portion 12 as a fulcrum by the protruding push rod 63 and is spaced away from the outer surface of the vehicle body 10. Thus, the operator can fully open the charger lid 11 by inserting the finger or the like between the charger lid 11 and the vehicle body 10. Moreover, the cover 69 covers a portion located above the flange portion 72 including the protruding portion of the push rod 63. As a result, a dust-proof/stain-proof function preventing intrusion of dust or stain into the push lifter 60 is exerted.

In the state where the push rod 63 protrudes the most, the lower end of the pressing bar 65 is located in the guide hole 61a of the holder 61 and is spaced away from the movable member 50. Moreover, the movable member 50 is held at the position P1 by the urging force of the return spring 51. Thus, the pair of contact portions 53 of the movable electrode 52 is short-circuited between the pair of fixed electrodes 47, and the switch portion 26 is on. As a result, the electronic control unit 85 is activated, and the illumination lamp 15 is turned on.

A charging cable (not shown) is connected to the battery charging connector 20 in this state, and the AC power supply is connected to the battery charger 86. Then, the electronic control unit 85 detects that the charging cable is connected. The electronic control unit 85 turns on the switch circuit 87 and connects the battery charger 86 to the battery B.

After that, the electronic control unit 85 monitors the charging state and the battery remaining level of the battery B on the basis of the current value and the voltage value, which are detection signals of the voltage sensor 89 and the current sensor 90. Then, the electronic control unit 85 controls display of the charging indicator 92 and the battery remaining level display portion 93 of the display device 22 on the basis of the monitoring result. Specifically, if the charging cable is connected to the battery charging connector 20 and charging is started, the current sensor 90 detects a charging current of the battery B. When the detection signal of the charging current is input into the electronic control unit 85, the electronic control unit 85 turns on the charging indicator 92. At this time, the charging indicator 92 is turned on with light of red, orange, yellow and the like, for example, by the illumination lamp 15. Moreover, if the output of the charging current is stopped, the electronic control unit 85 switches the charging indicator 92 from a lighted state to a flashing state on the basis of the detection signal. As a result, the operator confirms that the charging has been completed. The detection of completion of charging may be made on the condition that the voltage of the battery B reaches a predetermined voltage or that the current supplied to the battery B has lowered to a predetermined current or less.

If the battery charger 86 and the battery B are disconnected and the charging is turned off, the electronic control unit 85 switches the charging indicator 92 to an off state. Moreover, the electronic control unit 85 controls the battery remaining level display portion 93 so that states of fully charged to 0 are displayed in a plurality of levels in accordance with the battery remaining level.

Subsequently, a case where the charger lid 11 is to be closed will be described.

FIG. 5(a) illustrates a state where the push lifter 60 is pressed the deepest by the operator in order to move the charger lid 11 from the open state indicated by a solid line in FIG. 3 to a position Q indicated by a dotted line to bring the charger lid 11 to a closed state. At this time, when the operator presses the charger lid 11, the push lifter 60 is pressed by the charger lid 11.

In this state, each cam portion 77 of the push rod 63 moves downward from the upper end of the long groove 79 and then, is pressed onto the gradient portion 75 in the holder 61. Then, while the cam portion 77 is guided by the inclination of the gradient portion 75, the cam body 76 rotates only by a predetermined angle in one direction. In this embodiment, the predetermined angle is 22.5°. As a result, each cam portion 77 of the cam body 76 moves from the long groove 79 to the shallow groove 80 and is locked by the upper end of the shallow groove 80 (See FIG. 5(b)).

For purposes of illustration, FIG. 5(b) illustrates as if the cam portion 77 illustrated in FIG. 5(a) is rotated by 180°, but the cam portion 77 illustrated in FIG. 5(b) indicates a state where another cam portion 77 (not shown) in FIG. 5(a) has rotated only by the predetermined angle.

FIG. 5(b) illustrates a state where the pressing force applied to the charger lid 11 has been removed from the state where the push rod 63 is pushed in the most. If the pressing of the charger lid 11 by the operator is cancelled, that is, if a load in the pushing-in direction of the push rod 63 is removed, the push rod 63 somewhat moves in the protruding direction by the urging force of the coil spring 68. After that, by bringing each cam portion 77 into contact with the upper end of the corresponding shallow groove 80, movement of the push rod 63 is regulated. That is, the push rod 63 is held at a position somewhat returned in the opposite direction from the most pushed-in position by engagement between the cam portion 77 and the shallow groove 80.

On the other hand, the charger lid 11 is held at the closed position by being urged in the closing direction by the torsion coil spring 13. The closed position is a position where the charger lid 11 is brought into contact with the push lifter 60 by the urging force of the torsion coil spring 13 when the cam portion 77 is locked by the upper end of the shallow groove 80. When the charger lid 11 is located at the closed position, since the cam portion 77 is locked by the upper end of the shallow groove 80, the push rod 63 is held in a standby state. At this time, the cover 69 is in a contracted state due to the pushing-in force by the push rod 63 and serves the dust-proof/stain-proof action preventing intrusion of dust and strains into the push lifter 60.

When the push-push mechanism is operated, the pressing bar 65 of the push rod 63 is guided by the guide holes 61a to pass through the through hole 45 and to be inserted into the accommodation chamber 44. When the movable member 50 is pressed by the pressing bar 65, it moves in a direction away from the bottom wall 43 by a guide groove (not shown). After that, as illustrated in FIG. 5(b), the movable member 50 moves upward by the urging force of the return spring 51 and held in a state in contact with the lower end of the pressing bar 65 until each cam portion 77 is locked by the upper end of the shallow groove 80.

In the state in FIGS. 5(a) and 5(b), the movable member 50 moves downward, and the movable electrode 52 is spaced apart from the fixed electrode 47, thus the switch portion 26 is turned off. If the switch portion 26 is turned off, the electronic control unit 85 turns off the illumination lamp 15.

Subsequently, if the charger lid 11 is brought from the closed state to the open state, the operator presses the charger lid 11 toward the vehicle body 10 (closing direction). The distance moved by the operator by pressing the charger lid 11 at this time is equal to a difference between the position of the push rod 63 illustrated in FIG. 5(a) and a position of the push rod 63 illustrated in FIG. 5(b).

When the charger lid 11 is pressed, the push rod 63 is pushed in from the state in FIG. 5(b) against the urging force of the coil spring 68, and each cam portion 77 moves downward along the shallow groove 80. When each cam portion 77 is pressed onto the gradient portion 75 in the holder 61, the cam body 76 is guided along the inclination of the gradient portion 75 and rotates only by the predetermined angle in one direction. By means of this rotation, each cam portion 77 moves to the lower-end opening of the long groove 79 from the lower end of the shallow groove 80 and then, the push rod 63 moves upward along the long groove 79 by the urging force of the coil spring 68. As described above, the push rod 63 is switched to the protruding position illustrated in FIG. 3 from the position illustrated in FIG. 5(b). By means of the protruding operation of the push rod 63, the charger lid 11 rotationally moves in the open direction only by the predetermined angle by using the hinge portion 12 as a fulcrum.

According to this embodiment, the following advantages are achieved.

(1) The device for detecting opening/closing of the charger lid 11 is provided with the charger lid 11 and the push lifter 60. The charger lid 11 opens/closes the battery charging opening 14 and is urged in the closing direction by the torsion coil spring 13. The push lifter 60 is provided in the battery charging opening 14 and includes the push rod 63, which can push up the charger lid 11. Moreover, the device for detecting opening/closing is provided with the illumination lamp 15 provided in the battery charging opening 14 and capable of illuminating the inside of the battery charging opening 14 and the switch portion 26 for turning on/off the illumination lamp 15. When the charger lid 11 is located at the closed position, the push-push mechanism of the push lifter 60 holds the push rod 63 in the standby state. When the charger lid 11 at the closed position is pressed, the push-push mechanism releases the standby state of the push rod 63 and pushes up the charger lid 11 with the push rod 63 by the urging force of the coil spring 68 and opens the charger lid 11.

When the switch portion 26 is turned off due to the standby state of the push rod 63, the illumination lamp 15 is turned off, and if the switch portion 26 is turned on by the push rod 63 due to the release of the standby state of the push rod 63, the illumination lamp 15 is turned on. According to this configuration, the lock mechanism is not necessary, and the charger lid 11 can be held at the closed position. Moreover, the illumination lamp illuminating the battery charging opening 14 can be turned on/off in accordance with opening/closing of the charger lid 11. Thus, the number of components and the number of assembling processes can be reduced, and a manufacturing cost can be lowered.

(2) The device for detecting opening/closing is provided with the display device 22 displaying the charging state and the battery remaining level as the charging-related information at the battery charging opening 14. According to this configuration, the charging state and the battery remaining level can be confirmed during charging at the battery charging opening 14. Therefore, the operator does not have to move to the display device provided on the instrument panel in front of the driver's seat in order to check the charging state and the battery remaining level. Moreover, if the display device displaying the charging state and the battery remaining level is provided on the instrument panel in front of the driver's seat, since the display device is far from the battery charging opening, relevance between the display device and the charging operation at the battery charging opening 14 is low, making it difficult for the operator to understand. On the other hand, according to the present invention, since the display device 22 is provided at the battery charging opening 14, the relevance between the charging operation at the battery charging opening 14 and the display of the charged state and the battery remaining level by the display device 22 is high, making it easier for the operator to understand.

(3) The switch portion 26 and the display device 22 are integrated by the insulator 28 and constitute the device for detecting opening/closing. Moreover, the male terminals 40, 41, and 49 connected to the circuit of each of the switch portion 26 and the display device 22 are provided as the connection terminals in the insulator 28. As described above, since the switch portion 26 and the display device 22 are integrated by the common insulator 28, the device for detecting opening/closing can be attached to the battery charging opening 14 of the vehicle body 10 by using the common insulator 28. Moreover, the wire connection to each of the switch portion 26 and the display device 22 can be made easily through the male terminals 40, 41, and 49 as the connection terminals.

(4) On the basis of the turning-on of the switch portion 26, the electronic control unit 85 is activated, and the battery remaining level and the charging state relating to the battery B can be displayed on the display device 22.

(5) The electronic control unit 85 can turn on the illumination lamp 15 on the basis of the turning-on of the switch portion 26 and turn off the illumination lamp 15 on the basis of the turning-off of the switch portion 26.

The embodiment of the present invention may be modified as follows.

The present invention is embodied in the device for detecting opening/closing of a charger lid of the electric automobile, but may be applied to a plug-in hybrid vehicle, a fuel cell vehicle and the like, each being provided with an electric motor generating a traveling drive force and an electrical storage device composed of a secondary battery.

In the above-described embodiment, the charging indicator 92 and the battery remaining level display portion 93 are provided on the display panel 34 of the display device 22, but only the charging indicator 92 may be provided or only the battery remaining level display portion 93 may be provided.

In the above-described embodiment, the illumination lamp 15 is turned on after the switch portion 26 is turned on and the electronic control unit 85 is activated, but the illumination lamp 15 may be turned on/off directly by turning on/off of the switch portion 26.

Figure 8:
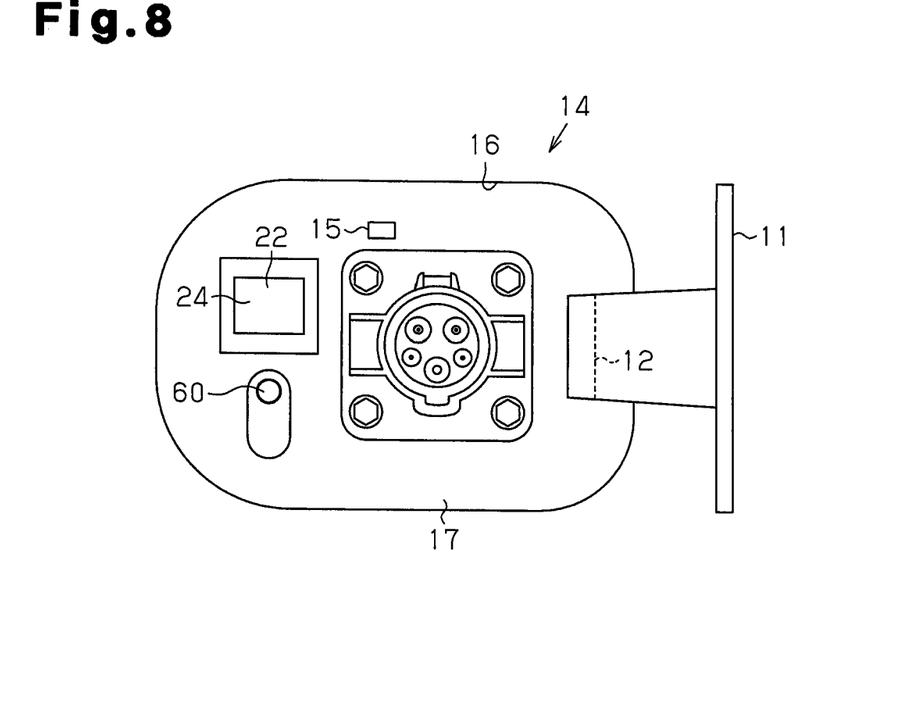
FIG. 8 is a front view of a battery charging opening of another embodiment.
Figure 9:
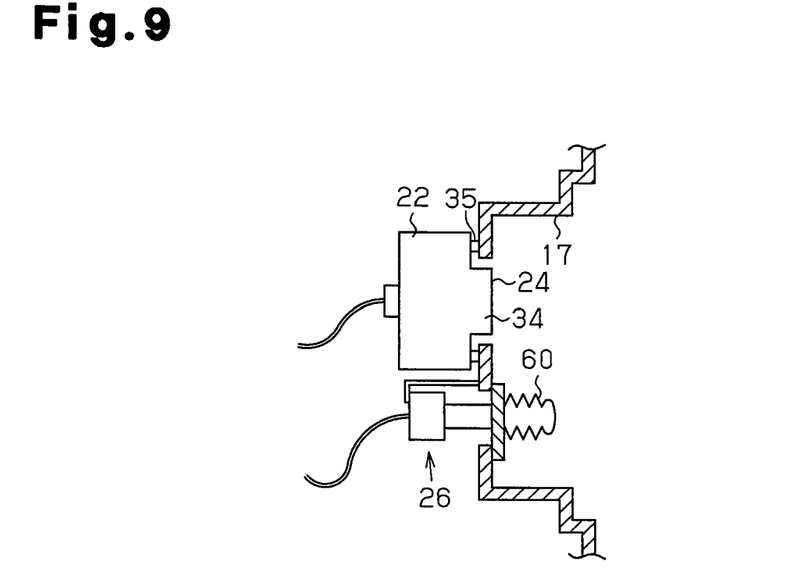
FIG. 9 is a cross-sectional view of a battery charging opening of another embodiment.

As illustrated in FIGS. 8 and 9, the display device 22 and the switch portion 26 may be separated from each other and they may be attached to the bottom wall 17, respectively, through a bracket. In this case, the switch portion 26 and the display device 22 may be arranged in the same positional relationship as that of the above-described embodiment.

Moreover, the switch means 100 and the charging indicator may be assembled separately to the bottom wall 17 or wire connection may be made separately.

The push-push mechanism provided in the push lifter 60 may be changed to another configuration other than the above-described embodiment.

The invention claimed is:

1. A device for detecting opening/closing of a charger lid provided in the vicinity of a battery charging opening of a vehicle body, the device comprising:
    a first urging means for urging the charger lid in a closing direction;
    a push rod provided in the battery charging opening and capable of pushing up the charger lid;
    an illumination means provided in the battery charging opening and capable of illuminating an inside of the battery charging opening;
    a switch means for turning on or off the illumination means;
    a second urging means for urging the charger lid in an opening direction; and
    a push-push mechanism, wherein
    when the charger lid is located at a closed position for closing the battery charging opening, the push-push mechanism holds the push rod in a standby state
    when the charger lid located at the closed position is pressed and the standby state of the push rod is cancelled, the push-push mechanism opens the charger lid by pushing up the push rod by an urging force of the second urging means,
    when the switch means is turned off by the push rod in the standby state, the illumination means is turned off, and
    when the switch means is turned on by the push rod no longer in the standby state, the illumination means is turned on.

2. The device for detecting opening or closing of a charger lid according to claim 1, wherein a display means for displaying charging-related information is provided at the battery charging opening.

3. The device for detecting opening or closing of a charger lid according to claim 2, wherein
    the charging-related information is a charging state of an onboard secondary battery,
    the display means is a charging indicator indicating the charging state,
    the switch means and the charging indicator are integrated by a common insulator, and
    the insulator includes a connection terminal to be connected to a circuit of each of the switch means and the charging indicator.

4. The device for detecting opening or closing of a charger lid according to claim 2, further comprising an electronic control unit, which is connected to the switch means and is activated when the switch means is turned on,
   wherein the electronic control unit displays obtained charging-related information on the display means.

5. The device for detecting opening or closing of a charger lid according to claim 2, wherein
   the charging-related information is a battery remaining level of an onboard secondary battery,
   the display means is a battery remaining level display means indicating the battery remaining level,
   the switch means and the battery remaining level display means are integrated by a common insulator, and
   the insulator includes a connection terminal to be connected to a circuit of each of the switch means and the battery remaining level display means.

6. The device for detecting opening or closing of a charger lid according to claim 5, further comprising an electronic control unit, which is connected to the switch means and is activated when the switch means is turned on,
   wherein the electronic control unit monitors a battery remaining level state of the onboard secondary battery and displays the battery remaining level state on the battery remaining level display means.

7. The device for detecting opening or closing of a charger lid according to claim 1, further comprising an electronic control unit, which is connected to the switch means and is activated when the switch means is turned on, wherein
   the electronic control unit turns on the illumination means when the switch means is turned on, and
   the electronic control unit turns off the illumination means when the switch means is turned off.

* * * * *

UNITED STATES PATENT AND TRADEMARK OFFICE
CERTIFICATE OF CORRECTION

PATENT NO.        : 8,845,001 B2
APPLICATION NO.   : 13/818070
DATED             : September 30, 2014
INVENTOR(S)       : Takeshi Kotama et al.

Page 1 of 1

It is certified that error appears in the above-identified patent and that said Letters Patent is hereby corrected as shown below:

On the Title page, please correct the spelling of the second Assignee from "Riki" to --Rika-- as follows:

Item (73) Assignees: Toyota Shatai Kabushiki Kaisha, Aichi-ken (JP); Kabushiki Kaisha Tokai Rika Denki Seisakusho, Aichi (JP)

Signed and Sealed this
Fourteenth Day of April, 2015

Michelle K. Lee
*Director of the United States Patent and Trademark Office*